(12) United States Patent
Huber et al.

(10) Patent No.: US 7,341,539 B2
(45) Date of Patent: Mar. 11, 2008

(54) TORQUE TRANSMITTING ASSEMBLY AND METHOD OF PRODUCING

(75) Inventors: David P. Huber, Millbury, OH (US);
Ben R. Vasa, Lapeer, MI (US);
Timothy J. Cripsey, Rochester, MI (US)

(73) Assignee: Metal Forming & Coining Corporation, Maumee, OH (US)

( * ) Notice: Subject to any disclaimer, the term of this patent is extended or adjusted under 35 U.S.C. 154(b) by 440 days.

(21) Appl. No.: 10/512,725

(22) PCT Filed: Jan. 14, 2004

(86) PCT No.: PCT/US2004/000903

§ 371 (c)(1),
(2), (4) Date: Oct. 26, 2004

(87) PCT Pub. No.: WO2004/065820

PCT Pub. Date: Aug. 5, 2004

(65) Prior Publication Data

US 2005/0164823 A1  Jul. 28, 2005

Related U.S. Application Data

(60) Provisional application No. 60/440,110, filed on Jan. 15, 2003.

(51) Int. Cl.
*F16H 57/08* (2006.01)

(52) U.S. Cl. .................................................. 475/331
(58) Field of Classification Search ............... 475/331, 475/337, 346; 29/893.1
See application file for complete search history.

(56) References Cited

U.S. PATENT DOCUMENTS

| | | | |
|---|---|---|---|
| 3,842,481 A | | 10/1974 | Laing |
| 4,043,021 A | | 8/1977 | Mosbacher et al. |
| 4,129,050 A | | 12/1978 | Akashi et al. |
| 4,597,453 A | * | 7/1986 | Kilmer et al. .............. 173/171 |
| 5,384,949 A | | 1/1995 | Wodrich et al. |
| 5,470,286 A | | 11/1995 | Fan |
| 6,074,323 A | * | 6/2000 | Collins et al. ............. 475/331 |
| 6,298,965 B1 | * | 10/2001 | Krause et al. ............. 192/3.29 |
| 6,434,827 B1 | | 8/2002 | Trent et al. |
| 6,702,711 B2 | * | 3/2004 | Zelikov et al. ............. 475/331 |

* cited by examiner

*Primary Examiner*—Sherry Estremsky
*Assistant Examiner*—Edwin A. Young
(74) *Attorney, Agent, or Firm*—Fraser Clemens Martin & Miller LLC; J. Douglas Miller

(57) ABSTRACT

An improvement in manufacturing and resulting structure of a torque transmitting assembly for use in a vehicle transmission which transmits torque from a first rotating member to a second rotating member wherein production efficiency is maximized and production costs are minimized.

18 Claims, 3 Drawing Sheets

TORQUE TRANSMITTING ASSEMBLY AND METHOD OF PRODUCING

CROSS-REFERENCE TO RELATED APPLICATION

This application is a 371 of PCT/US04/00903, filed Jan. 14, 2004, which claims the benefit of U.S. provisional patent application Ser. No. 60/440,110, filed Jan. 15, 2003.

FIELD OF THE INVENTION

The present invention relates to a torque transmitting assembly and a method of making the same and more particularly a combined pinion carrier and drive shell and a method of making the same.

BACKGROUND OF THE INVENTION

A pinion carrier is a support structure that locates pinion (or planet) gears in a planetary gear set and transmits torque to other components within a vehicle transmission. A drive shell or planet carrier is a tubular metal component that carries torque from the pinion carrier to another component axially displaced from the pinion carrier in the transmission. The drive shell also revolves around the central axis of the pinion carrier and supports the pinion gears.

Some known methods for producing a pinion carrier include progressively stamping a cup and an end plate and welding the two pieces together; producing powdered metal components which are brazed or bolted together; or cold forming a cup which is welded to a stamped plate.

Current methods for producing a drive shell include deep drawing sheet metal to a tubular shape and forming splines on an inner wall thereof, and cutting a thin walled tube to length and forming splines on an inner surface thereof.

Known methods of producing a combined carrier and drive shell include progressively stamping cups from metal stock having different diameters which are then welded together facing each other. The inner cup is used as the pinion carrier, and the outer cup is used as the drive shell.

In respect of the practices listed above, several problems are experienced in forming the pinion-carrier portion of the assembly. Due to the brittle nature of powdered metal parts, the cross-section of the portion of the pinion carrier that separates the retaining faces must be structurally large. During the manufacturing process, a grain density variation is created at the bases of the portion of the pinion carrier that separate retaining faces where it meets much thinner retaining faces. This density variation, along with the concurrent thickness change in the same area, results in a stress riser that frequently causes fracture and failure of the component. To counteract this, the legs and retaining faces must be made thicker than would be needed when produced from wrought material in order for the part to survive its application. This results in increased weight and space consumption, both of which are expensive and undesirable in an automatic transmission environment.

For stamped parts, the production method provides more flexibility than powdered metal and generally reduces space consumption by comparison. However, there is no ability to significantly change the material thickness for any component of the assembly. Therefore, the entire part will be the same thickness as that portion of the assembly needing the most strength. The result is excess mass and space consumption, although it represents a large improvement in these aspects as compared to parts produced from powdered metal. The biggest weakness of stamped parts is the lack of stiffness. Under heavy loading, the stamped parts frequently deflect to the point that the gears may become misaligned causing undesirable noise and wear.

For cold formed parts, improved stiffness is experienced over stampings, and the process can create various material thicknesses in different locations on the components. Therefore, it can minimize overall mass while concentrating material in critical areas. Furthermore, tooling is comparable to that for powdered metal and far less expensive and complex than that required for stamping. The level of detail achievable in cold forming is good enough that many applications require no machining other than creating the pinion shaft holes after forming. However, cold forming is somewhat limited in its ability to create long extrusions cost-effectively.

Additionally, the torque transmitting method used in the pinion carrier and drive shell assembly also results in addition of materials causing increased weight and space consumption. Adapter plates are interposed between the corresponding rotational parts of the pinion carrier and the drive shell to transfer the torque from one to the other.

It would be desirable to produce a torque transmitting assembly wherein production efficiency is maximized and weight and production costs are minimized.

SUMMARY OF THE INVENTION

Consistent and consonant with the present invention, a torque transmitting assembly wherein production efficiency is maximized and weight and production costs are minimized, has surprisingly been discovered. The torque transmitting assembly comprises: a generally cup shaped outer shell having a closed end and an open end, the closed end having at least one slot formed therein, the open end of the outer shell adapted to be operatively engaged with a first rotating member; and a generally disk shaped inner member having a central aperture and a central axis, the inner member including at least one tab extending axially outwardly therefrom and engaging the slot of the outer shell to facilitate a transfer of rotation between the outer shell and the inner member, the central aperture adapted to be operatively engaged with a second rotating member.

BRIEF DESCRIPTION OF THE DRAWINGS

The above, as well as other objects, features, and advantages of the present invention will be understood from the detailed description of the preferred embodiments of the present invention with reference to the accompanying drawings, in which.

DESCRIPTION OF INVENTION

Figure 1:
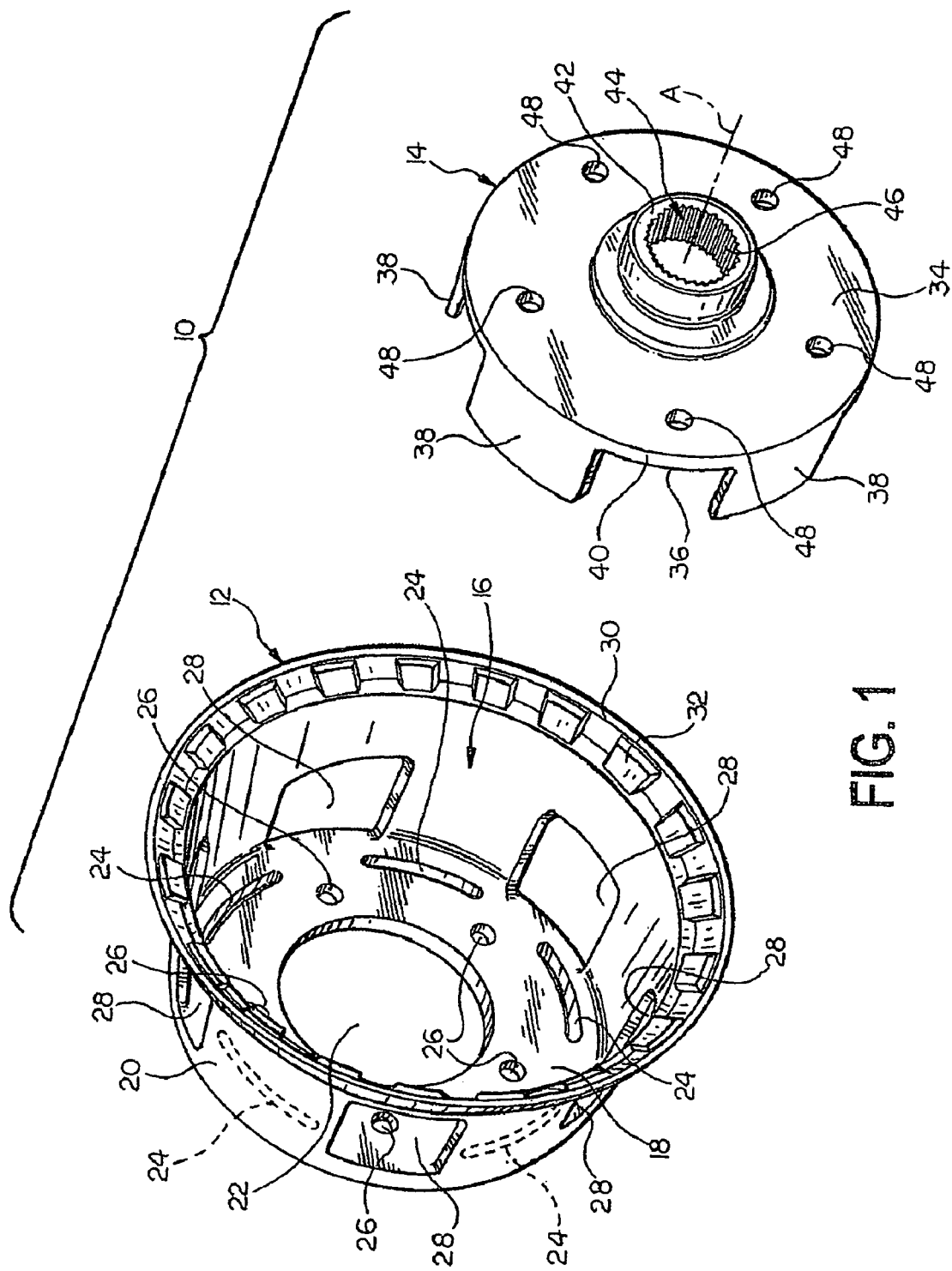
FIG. 1 is an exploded perspective view of a pinion carrier and drive shell assembly in accordance with the present invention.
Figure 2:
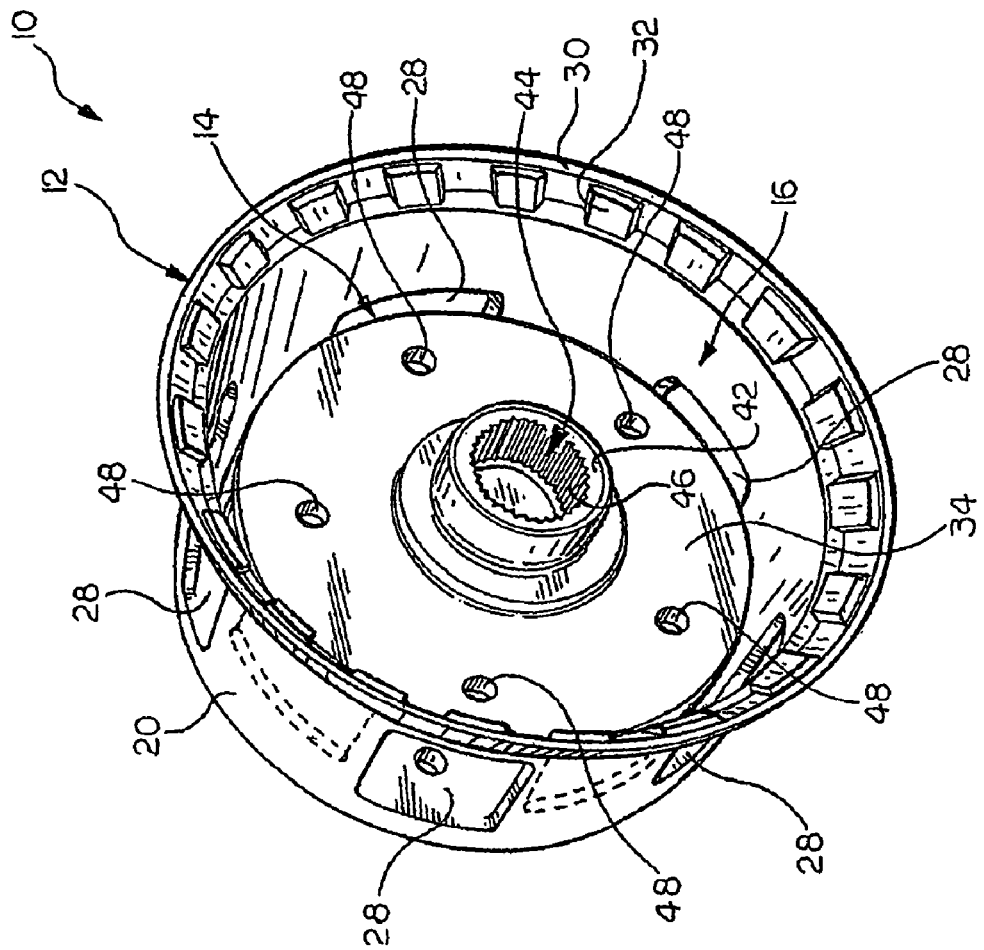
FIG. 2 is a perspective view of the pinion carrier and drive shell assembly of FIG. 1 shown assembled.
Figure 3:
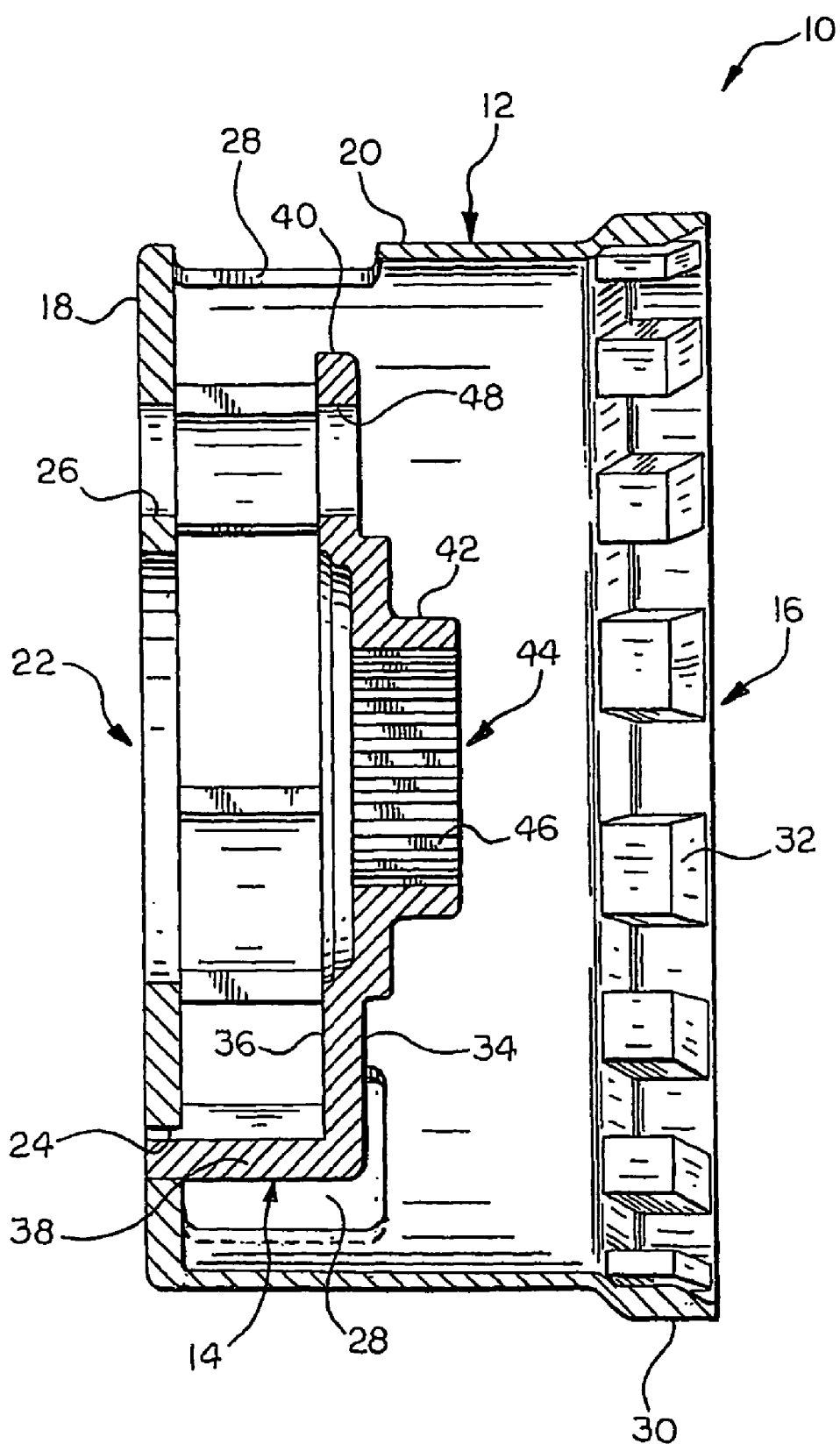
FIG. 3 is a section view of the pinion carrier and drive shell assembly of FIG. 2 taken along line 3-3.

Referring now to the drawings, and particularly FIG. 1, there is shown generally at 10 an exploded perspective view of a pinion carrier and drive shell assembly or torque transmitting assembly incorporating the features of the invention. The pinion carrier and drive shell assembly 10 includes a drive shell 12 and a pinion carrier 14.

The drive shell 12 is a generally cup shaped or bowl shaped outer shell having an open end 16, a closed end 18, and an outer wall 20. The closed end 18 of the drive shell 12 includes a central aperture 22 formed therein. An annular array of slots 24 is formed in the closed end 18 and surrounds the aperture 22. Holes 26 are interposed between adjacent slots 24 to form an annular array of the holes 26 around the aperture 22 of the closed end 18. A plurality of access holes 28 is formed in the outer wall 20 of the drive shell 12. In the embodiment shown, the access holes 28 are formed adjacent the holes 26 to provide access thereto and facilitate assembly of the pinion carrier and drive shell assembly 10. An outwardly extending lip 30 surrounds the open end 16 of the drive shell 12. A plurality of splines or teeth 32 is formed on an inner surface of the lip 30.

The pinion carrier 14 is a generally disk shaped inner member with a central rotational axis A, a first side 34, and a second side 36. A plurality of tabs 38 extends axially outwardly from the second side 36 adjacent an outer edge 40 of the pinion carrier 14. A central collar 42 extends axially outwardly from the first side 34 of the pinion carrier 14 and has a central aperture 44 formed therein. An annular array of teeth 46 is formed on an inner surface of the collar 42 and is adapted to receive the end of a shaft (not shown) therein, the shaft having teeth formed on an outer surface thereof. An annular array of holes 48 is formed in the pinion carrier 14 and is positioned to be aligned with the holes 26 formed in the closed end 16 of the drive shell 12.

Assembly of the pinion carrier and drive shell assembly 10 is accomplished by providing the drive shell 12 and the pinion carrier 14 as shown and described. The tabs 38 of the pinion carrier 14 are aligned with the slots 24 of the drive shell 12. Once aligned, the tabs 38 are inserted into the corresponding slots 24 until an outer end of each of the tabs 38 is substantially flush with an outer surface of the closed end 18. Bolts or rods (not shown) can be inserted through the holes 26 and the holes 48 to assist in alignment of the tabs 38 and the slots 24. The rods or bolts can be removed or left in as desired after assembly of the pinion carrier and drive shell assembly 10 is complete. Once the tabs 38 have been inserted, the tabs 38 are welded to the drive shell 12 to militate against separation of the drive shell 12 and the pinion carrier 14 when in use. Desirable results have been obtained using laser welding to join the tabs 38 with the drive shell 12, however, it is understood that other welding and joining methods can be used. In the embodiment shown, the tabs 38 are welded to the drive shell 12 on a radially outward portion of the tabs 38 adjacent the outer surface of the closed end 18 of the drive shell 12. It is understood that the tabs 38 could be welded to the drive shell 12 in a different location without departing from the scope and spirit of the invention.

Once assembled, the shaft having teeth formed on the outer surface thereof is inserted through the aperture 22 of the closed end 18 of the drive shell 12 and into the aperture 44 of the collar 42 to mate with the teeth 46 formed therein. A rotating member (not shown) is received adjacent the lip 30 to engage the splines 32 thereof. Thus, rotation of the shaft can be transferred to the rotating member, or from the rotating member to the shaft through the pinion carrier and drive shell assembly 10. The pinion carrier and drive shell assembly 10 is especially useful in a vehicle transmission, but it is understood that the pinion carrier and drive shell assembly 10 can be used in other applications as well.

The drive shell 12 and the pinion carrier 14 can be formed by any conventional production method such as stamping, cutting, drawing, cold forming, and flow forming, for example. Desirable results have been achieved by forming the drive shell 12 using a flow formed or cold formed method and forming the pinion carrier 14, often referred to as a "cup" or "pedestal", by cold forging or stamping. The use of flow forming, which is similar to cold forming, can concentrate the material where it is needed for strength. In addition, extremely long tubular sections can be produced, and is therefore well suited to creating the drive shell 12 of the pinion carrier and drive shell assembly 10.

Several benefits are achieved by forming and assembling the drive shell 12 and the pinion carrier 14 using the methods described. First, an assembled joint is eliminated between the pinion carrier 14 and the drive shell 12 which typically includes a retaining ring and two mating splines. Second, cold work hardening of the drive shell 12 increases the strength thereof and thus, the mass of the drive shell 12 can be reduced compared to a stamped drive shell 12 at the same torque rating. Third, better alignment of critical portions of the pinion carrier and drive shell assembly 10 is experienced with minimized backlash between unnecessary spline joints while maximizing balance. Fourth, material thickness can be varied throughout the pinion carrier and drive shell assembly 10 with thicker material where needed for locating the pinion shafts and resisting twisting of the planetary carrier portion and thinner material where permissible such as on the drive shell 12, for example.

From the foregoing description, one ordinarily skilled in the art can easily ascertain the essential characteristics of this invention and, without departing from the spirit and scope thereof, can make various changes and modifications to the invention to adapt it to various usages and conditions.

What is claimed is:

1. A torque transmitting assembly comprising:
a generally cup shaped outer shell having a closed end and an open end, the closed end having at least one slot formed therein, the outer shell including an outwardly extending lip surrounding the open end of said outer shell, the open end of said outer shell adapted to be operatively engaged with a first rotating member; and
a generally disk shaped inner member having a central aperture and a central axis, said inner member including at least one tab extending axially outwardly therefrom and engaging the slot of said outer shell to facilitate a transfer of rotation between said outer shell and said inner member, the central aperture adapted to be operatively engaged with a second rotating member, wherein said inner member is received inside said outer shell.

2. The assembly according to claim 1, wherein said outer shell is a drive shell.

3. The assembly according to claim 1, wherein said inner member is a pinion carrier.

4. The assembly according to claim 1, wherein the tab of said inner member is welded to the closed end of said outer shell.

5. The assembly according to claim 1, wherein said inner member includes a central collar surrounding the central aperture of said inner member extending axially outwardly in a direction opposite the tab.

6. The assembly according to claim 5, wherein an annular array of teeth is formed on an inner surface of the collar.

7. The assembly according to claim 1, wherein said outer shell includes a plurality of splines formed on an inner surface of the lip to engage the first rotating member.

8. A torque transmitting assembly comprising:
a drive shell having a closed end and an open end, the closed end having a plurality of slots formed therein, the drive shell including an outwardly extending lip surrounding the open end of said drive shell, the open end of said drive shell adapted to be operatively engaged with a first rotating member; and a pinion carrier having a central aperture and a central axis, said pinion carrier including a plurality of tabs extending axially outwardly therefrom and engaging the slots of said drive shell to facilitate a transfer of rotation between said drive shell and said pinion carrier, the central aperture adapted to be operatively engaged with a second rotating member.

9. The assembly according to claim 8, wherein the tabs of said pinion carrier are welded to the closed end of said drive shell.

10. The assembly according to claim 8, wherein the tabs of said pinion carrier are laser welded to the closed end of said drive shell.

11. The assembly according to claim 8, wherein said pinion carrier includes a central collar surrounding the central aperture of said pinion carrier extending axially outwardly in a direction opposite the tabs.

12. The assembly according to claim 11, wherein an annular array of teeth is formed on an inner surface of the collar.

13. The assembly according to claim 8, wherein said drive shell includes a plurality of splines formed on an inner surface of the lip to engage the first rotating member.

14. A method of producing a pinion carrier and drive shell assembly, the method comprising the steps of:

providing a drive shell having a closed end and an open end, the closed end having a plurality of slots formed therein, the drive shell including an outwardly extending lip surrounding the open end of said drive shell, the open end of the drive shell adapted to be operatively engaged with a first rotating member;

providing a pinion carrier having a central aperture and a central axis, the pinion carrier including a plurality of tabs extending axially outwardly therefrom, the central aperture adapted to be operatively engaged with a second rotating member;

inserting the pinion carrier into the drive shell; and inserting the tabs of the pinion carrier into the slots of the drive shell to facilitate a transfer of rotation between the drive shell and the pinion carrier.

15. The method according to claim 14, including the step of welding the tabs of the pinion carrier to the closed end of the drive shell.

16. The method according to claim 14, including the step of laser welding the tabs of the pinion carrier to the closed end of the drive shell.

17. The method according to claim 14, including the step of producing the drive shell by cold forming.

18. The method according to claim 14, including the step of producing the drive shell by flow forming.

* * * * *